(12) United States Patent
Lee et al.

(10) Patent No.: US 7,967,394 B2
(45) Date of Patent: Jun. 28, 2011

(54) HYDRAULIC UNIT OF ELECTRONIC CONTROL BRAKE SYSTEM

(75) Inventors: Sang-Cheol Lee, Gyeonggi-do (KR); Chung Jae Lee, Gyeonggi-do (KR); Yong Kap Kim, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 692 days.

(21) Appl. No.: 12/016,665

(22) Filed: Jan. 18, 2008

(65) Prior Publication Data
US 2008/0179942 A1    Jul. 31, 2008

(30) Foreign Application Priority Data
Jan. 26, 2007   (KR) .................. 10-2007-0008259

(51) Int. Cl.
*B60T 8/40* (2006.01)
(52) U.S. Cl. .................. 303/116.2; 303/DIG. 10
(58) Field of Classification Search .......... 303/119.3, 303/3, 10, 11, 116.1–116.3, DIG. 10
See application file for complete search history.

(56) References Cited

U.S. PATENT DOCUMENTS

| | | | |
|---|---|---|---|
| 6,846,050 B2 * | 1/2005 | Inoue et al. | 303/119.3 |
| 7,441,843 B2 * | 10/2008 | Otto | 303/119.3 |
| 2004/0046446 A1 * | 3/2004 | Dinkel et al. | 303/119.3 |
| 2006/0220768 A1 * | 10/2006 | Iyatani | 335/78 |

FOREIGN PATENT DOCUMENTS

| | | |
|---|---|---|
| DE | 102 37 163 A1 | 2/2006 |
| DE | 199 59 670 B4 | 4/2006 |
| KR | 1020050046410 A | 5/2005 |

* cited by examiner

*Primary Examiner* — Melanie Torres Williams
(74) *Attorney, Agent, or Firm* — McDermott Will & Emery LLP

(57) ABSTRACT

A hydraulic unit of an electronic control brake system capable of achieving compactness of a modulator block by optimizing connection between components and valves, which are mounted in the modulator block, is disclosed. The hydraulic unit of an electronic control brake system includes a modulator block mounted with components to control braking hydraulic pressure applied to wheels of an automobile, including a plurality of inflow and outflow valves, a traction control valve, a shuttle valve, an accumulator, a pump and a motor. The modulator block is formed with oil lines therein-side to connect the components. The modulator block has a hexahedral shape. A wheel cylinder connecting part is disposed at a first surface of the modulator block, and a master cylinder connecting part is disposed at a second surface of the modulator block. Accordingly, a width of the surface, at which the wheel cylinder connecting part is disposed, can be decreased. Since the traction control valve is positioned above the shuttle valve at a rear surface of the modulator block, and the motor is positioned at a center portion of the modulator block, an overall size of the modulator block becomes compact.

3 Claims, 2 Drawing Sheets

HYDRAULIC UNIT OF ELECTRONIC CONTROL BRAKE SYSTEM

CROSS-REFERENCE TO RELATED APPLICATION

This application claims the benefit of Korean Patent Application No. 2007-0008259, filed on Jan. 26, 2007 in the Korean Intellectual Property Office, the disclosure of which is incorporated herein by reference.

BACKGROUND OF THE INVENTION

1. Field of the Invention

The present invention relates to a hydraulic unit of an electronic control brake system of an automobile, and more particularly, to a hydraulic unit of an electronic control brake system capable of optimally forming oil lines connecting components and valves which are mounted in a modulator block.

2. Description of the Related Art

An electronic control brake system efficiently prevents wheels from slipping while braking, rapid starting or rapid accelerating of an automobile. Such an electronic control brake system generally includes a booster, a master cylinder, wheel cylinders, a hydraulic unit to control a braking hydraulic pressure, and an electronic control unit (ECU) to control the hydraulic unit.

The hydraulic unit includes a plurality of solenoid valves (inflow and outflow valves) to control a braking hydraulic pressure transmitted to the wheel cylinders, an accumulator to temporarily store oil discharged from wheel brakes, a pair of oil pumps which are driven by a motor, shuttle valves mounted on suction lines of the oil pumps, and traction control valves mounted on discharge lines of the oil pumps. These components are mounted inside a modulator block, which is made of aluminum.

The conventional modulator block has a hexahedral shape. Master cylinder connecting parts and wheel cylinder connecting parts are mounted to a top surface of the modulator block. The inflow valves, the shuttle valves/the oil pumps/the motor, the outflow valves, and the traction control valves are arranged in order from the above in the modulator block.

By such arrangement, a distance between the master cylinder and the shuttle valves is short. However, there are problems such that oil lines connected from the master cylinder to the shuttle valves, the oil pumps, the traction control valves and the wheel cylinders become long and complicated, and accordingly many holes (e.g., eight holes) should be provided to form the oil lines inside the modulator block.

Further, in the above arrangement, because the master cylinder connecting parts and the wheel cylinder connecting parts are disposed at the same surface (i.e., the top surface of the modulator block), there is a limitation in decreasing a width of the top surface. Still further, because the motor to drive the oil pumps is disposed in a lower portion of the modulator block, in which the shuttle valves and the oil pumps are disposed, a size of the modulator block becomes unnecessarily large.

SUMMARY OF THE INVENTION

Therefore, it is an aspect of the invention to provide a hydraulic unit of an electronic control brake system capable of achieving compactness of a modulator block by optimizing connection between components and valves which are mounted in the modulator block.

Additional aspects and/or advantages of the invention will be set forth in part in the description which follows and, in part, will be obvious from the description, or may be learned by practice of the invention.

In accordance with an aspect of the invention, there is provided a hydraulic unit of an electronic control brake system, comprising: a modulator block mounted with components to control braking hydraulic pressure applied to wheels of an automobile, including a plurality of inflow and outflow valves, a traction control valve, a shuttle valve, an accumulator, a pump and a motor, the modulator block being formed with oil lines thereinside to connect the components. The modulator block has a hexahedral shape, and the modulator block is provided with a wheel cylinder connecting part disposed at a first surface of the modulator block, and a master cylinder connecting part disposed at a second surface of the modulator block.

The motor may be mounted to the second surface of the modulator block.

The master cylinder connecting part, the traction control valve, the inflow valves, the shuttle valve/the pump/the motor, and the outflow valves may be arranged in order from the above in the modulator block. The master cylinder connecting part and the motor may be positioned at the same surface of the modulator block, and the traction control valve, the inflow valves, the shuttle valve and the outflow valves may be positioned at the same surface of the modulator block.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
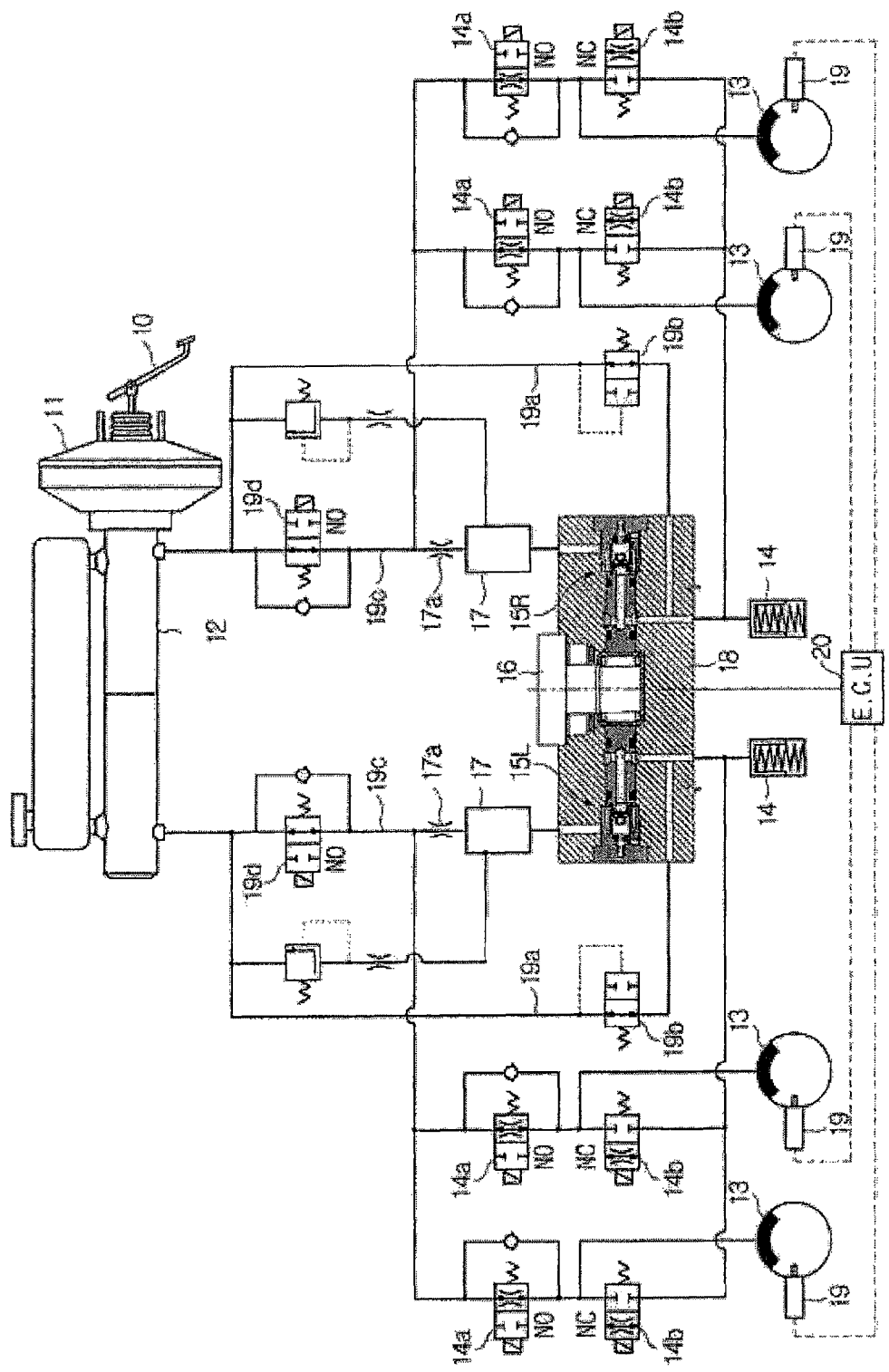
FIG. 1 is a hydraulic circuit diagram of an electronic control brake system according to the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

FIG. 1 is a hydraulic circuit diagram of an electronic control brake system according to the present invention. As shown in FIG. 1, an electronic control brake system according to the present invention includes a plurality of solenoid valves 14a and 14b to control a braking hydraulic pressure generated from a booster 11 and a master cylinder 12, which interlock with a brake pedal 10, to be transmitted to wheel brakes 13 provided at front and rear wheels of an automobile, low pressure accumulators 14 to temporarily store pressurized oil discharged from the wheel brakes 13, a pair of oil pumps 15L and 15R to suck the pressurized oil from the low pressure accumulators 14 or the master cylinder 12 and output the oil, a motor 16 to drive the pair of oil pumps 15L and 15R at the same time, and high pressure accumulators 17, each of which has an orifice 17a at an outlet line thereof to decrease pressure pulsation of the pressurized oil outputted from the oil pumps 15L and 15R. The above-described components are installed inside a modulator block 100 (refer to FIG. 2), which is made of aluminum.

Of the solenoid valves 14a and 14b, each of the first valves 14a is mounted on an oil line at an upstream position before an associated wheel brake 13 and uses a normal open (NO) type solenoid valve (hereinafter, referred to as an inflow valve) which is normally kept open, while each of the second valves 14b is mounted on the oil line at a downstream position after the wheel brake 13 and uses a normal close (NC) type solenoid valve (hereinafter, referred to as an outflow valve) which is normally kept closed. The opening/closing operation of the inflow and outflow valves 14a and 14b is controlled by an electronic control unit (ECU) 20, which senses a traveling speed by use of wheel sensors 19 provided at the front and rear wheels.

The electronic control brake system according to the present invention further includes bypass oil lines 19a which connect the outlet line of the master cylinder 12 and the inlet lines of the pumps 15L and 15R. Shuttle valves (ESVs) 19b, which are normally kept open, are mounted on the bypass oil lines 19a. When a driver steps on the brake pedal 10 and the braking hydraulic pressure is generated, the shuttle valves 19b close the oil lines. This is to permit the braking hydraulic pressure, which is generated when the driver steps on the brake pedal 10, to be applied to the wheel brakes 13.

Traction control (TC) NO type valves 19d are mounted on oil lines 19c which are provided between the outlet of the master cylinder 12 and the outlets of the high pressure accumulators 17. When the wheels slip on the road due to, for example, the rapid starting, the traction control NO type valves 19d, which are normally kept open, close the oil lines, so that the braking hydraulic pressure generated by the operation of the pumps 15L and 15R can be applied to the wheel brakes 13. Accordingly, though the driver does not step on the brake pedal 10, the automobile can brake.

The pair of oil pumps 15L and 15R are driven with a certain phase difference by the single motor 16. The oil pumps 15L and 15R pressurize the oil from the low pressure accumulators 14 or the master cylinder 12, and pump the pressurized oil to the high pressure accumulators 17.

Figure 2:
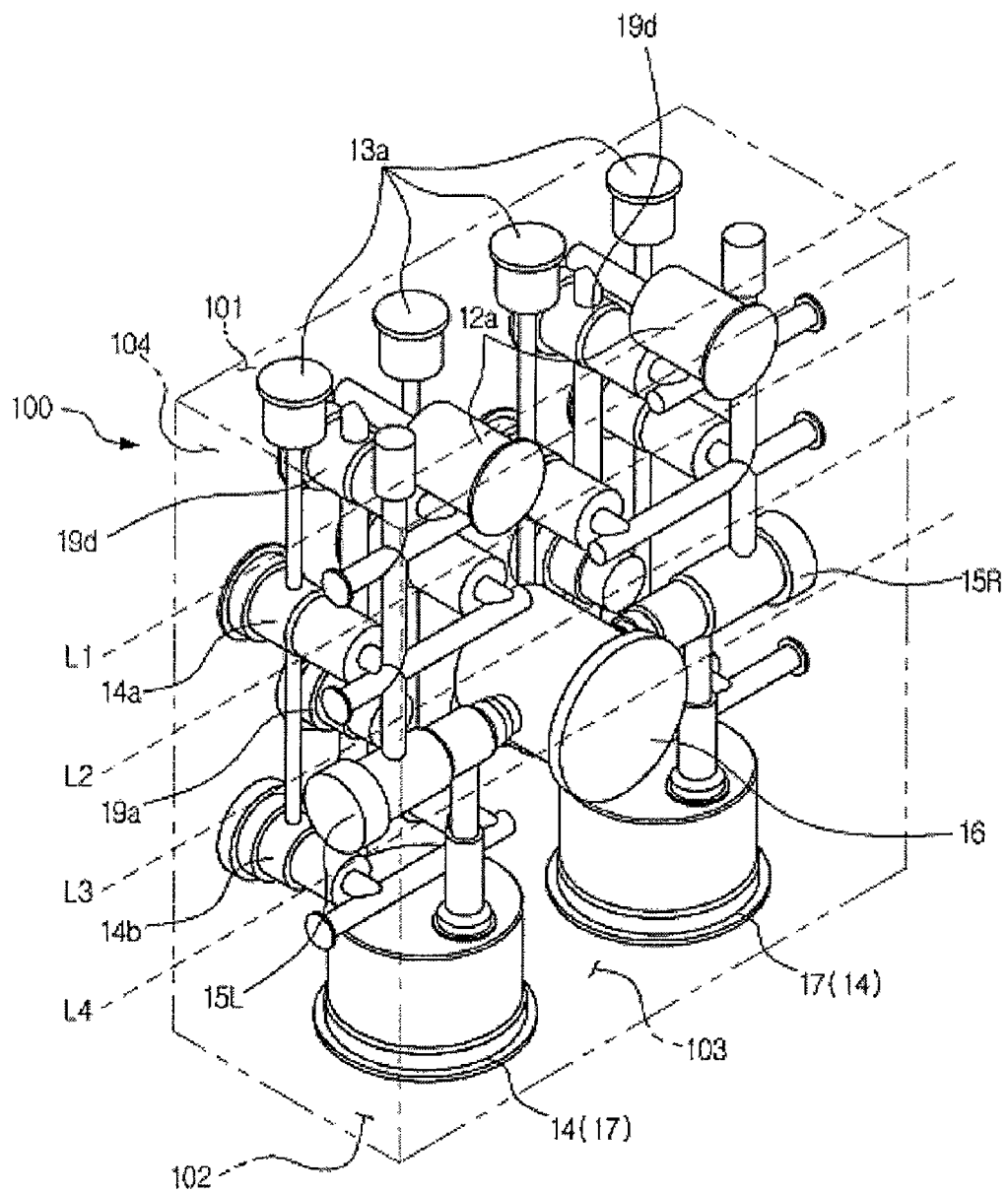
FIG. 2 is a perspective view schematically showing a modulator block of a hydraulic unit of the electronic control brake system according to the present invention.

FIG. 2 is a view schematically showing the modulator block of the hydraulic unit as constituted above.

As shown in FIG. 2, the modulator block 100 has a hexahedral shape. Wheel cylinder connecting parts 13a are mounted to a top surface 101 of the modulator block 100, and the accumulators 14 and 17 are mounted to a bottom surface 102 of the modulator block 100.

Master cylinder connecting parts 12a, an arrangement row L1 of the traction control NO type valves 19d, an arrangement row L2 of the inflow valves 14a, an arrangement row L3 of the shuttle valves 19b, the pumps 15L and 15R and the motor 16, and an arrangement row L4 of the outflow valves 14b are positioned in order from the above inside the modulator block 100. Here, the master cylinder connecting parts 12a are disposed at a front surface 103 of the modulator block 100, and the arrangement row L1 of the traction control NO type valves 19d, the arrangement row L2 of the inflow valves 14a and the arrangement row L4 of the outflow valves 14b are disposed at a rear surface 104 of the modulator block 100. In the arrangement row L3 of the shuttle valves 19b, the pumps 15L and 15R and the motor 16, the motor 16 is disposed at the front surface 103 of the modulator block 100, the shuttle valves 19b are disposed at the rear surface 104 of the modulator block 100, and the oil pumps 15L and 15R are respectively disposed at left and right side surfaces of the modulator block 100.

In the above arrangement of the components, the oil lines extending from the master cylinder connecting parts 12a are connected to the traction control NO type valves 19d. The oil lines extending from the traction control NO type valves 19d are branched such that one is connected to the shuttle valves 19b and the suction ports of the oil pumps 15L and 15R and the other is connected to the wheel cylinder connecting parts 13a via the inflow valves 14a. In such a case, five holes are necessary to form the oil lines to connect the components in the modulator block 100.

Since the traction control NO type valves 19d are disposed in the upper portion of the modulator block 100, the overall oil lines are shortened. Also since the master cylinder connecting parts 12a and the wheel cylinder connecting parts 13a are not positioned at the same surface, the modulator block 100 can be decreased in width. Also since the motor 16 is positioned at the center portion of the front surface 103 of the modulator block 100, the overall size of the modulator block 100 becomes compact.

As apparent from the above description, the modulator block of the hydraulic unit of the electronic control brake system according to the present invention can decrease a width of the surface, at which the wheel cylinder connecting parts are mounted, because the master cylinder connecting parts and the wheel cylinder connecting parts are not positioned at the same surface.

Further, since the traction control NO type valves are positioned above the shuttle valves at the rear surface of the modulator block, and the motor is positioned at the center portion of the front surface of the modulator block, the overall size of the modulator block becomes compact.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hydraulic unit of an electronic control brake system, comprising:
   a modulator block mounted with components to control braking hydraulic pressure applied to wheels of an automobile, including a plurality of inflow and outflow valves, a traction control valve, an ESV valve, an accumulator, a pump and a motor, the modulator block being formed with oil lines there inside to connect the components,
   wherein the modulator block has a hexahedral shape, and the modulator block is provided with a wheel cylinder connecting part disposed at a first surface of the modulator block, and a master cylinder connecting part disposed at a second surface of the modulator block,
   wherein the ESV valve is mounted on a bypass oil line which connects an outlet line of the master cylinder and an inlet line of the pump.

2. The hydraulic unit according to claim 1, wherein the motor is mounted to the second surface of the modulator block.

3. The hydraulic unit according to claim 1, wherein the master cylinder connecting part, the traction control valve, the inflow valves, the ESV valve/the pump/the motor, and the outflow valves are arranged in order from the above in the modulator block,
   and wherein the master cylinder connecting part and the motor are positioned at the same surface of the modulator block, and
   the traction control valve, the inflow valves, the ESV valve and the outflow valves are positioned at the same surface of the modulator block, valve and the outflow valves are positioned at the same surface of the modulator block.

* * * * *